United States Patent [19]

Cohen

[11] Patent Number: 5,012,440
[45] Date of Patent: Apr. 30, 1991

[54] OUTER PRODUCT OPTICAL INTERFEROMETER WITH MASK

[75] Inventor: Jonathan D. Cohen, Hanover, Md.

[73] Assignee: The United States of America as represented by the Director, National Security Agency, Washington, D.C.

[21] Appl. No.: 318,027

[22] Filed: Mar. 1, 1989

[51] Int. Cl.⁵ .......................... G06E 3/00; G06G 7/19; G01B 9/02

[52] U.S. Cl. ..................................... 364/837; 356/353; 356/345; 364/827

[58] Field of Search ....................... 364/822, 837, 827; 356/345, 346, 353, 354, 355, 356; 350/162.11

[56] References Cited

U.S. PATENT DOCUMENTS

| | | | |
|---|---|---|---|
| 3,829,219 | 8/1974 | Wyant | 356/353 |
| 4,089,589 | 5/1978 | Brockman et al. | 364/822 |
| 4,118,124 | 10/1978 | Matsuda | 356/353 |
| 4,265,534 | 5/1981 | Remijan | 356/354 |
| 4,413,909 | 11/1983 | Pohle | 356/354 |
| 4,556,950 | 12/1985 | Tai et al. | 364/827 |
| 4,670,646 | 6/1987 | Spivey | 356/354 |
| 4,707,137 | 11/1987 | Lee | 356/353 |
| 4,711,576 | 12/1987 | Ban | 356/353 |
| 4,758,976 | 7/1988 | Cohen | 364/837 |

OTHER PUBLICATIONS

Sov. J. Opt. Technol 48, Aug. 8, 1981, pp. 449–451.

*Primary Examiner*—Jerry Smith
*Assistant Examiner*—Jim Trammell
*Attorney, Agent, or Firm*—Thomas O. Maser; John R. Utermohle

[57] ABSTRACT

An outer product shearing interferometer for an optical source of one-dimensional extent which provides simultaneous interference between every two points on the source. The interferometer comprises an input plane containing the source, an output plane for observing the outer product, an imaging system between the two planes, and a mask positioned in the transform plane of the imaging system and having slits arranged to effect the desired outer product. The desired outer product results from a simultaneous application of many lateral shears instead of only one at a time.

3 Claims, 1 Drawing Sheet

OUTER PRODUCT OPTICAL INTERFEROMETER WITH MASK

BACKGROUND OF THE INVENTION

Interferometers which superimpose two versions of the same optical wavefront are known as shearing interferometers. Using a shearing interferometer one may measure the relative phase between different points on the same wavefront. Shearing interferometers have been employed for component testing, astronomical observation, turbulence studies, coherence measurement, and optical signal processing. They are classed as lateral, radial, reversing, or rotational, depending on whether the resulting wavefront versions are related to each other by translation, dilation, reflection about a line, or rotation, respectively.

The problem addressed by my invention is to operate on an object which is one-dimensional and to provide simultaneous interference between every pair of points on the object. Specifically, suppose that the object has scalar field amplitude $$a(x,y,t) = a(x,t)\delta(y),$$

where $\delta$ is the Dirac delta function and $a(x,t)$ is some function to be examined. The problem is to produce a plane in which the optical intensity has a term proportional either to $$I_1(x,y,t) = Re\{a(x,t-d)a^*(y,t-d)\}$$

or to $$I_2(x,y,t) = Re\{a(x,t-d)a^*(x+y,t-d)\},$$

depending upon which format is more convenient for the application, and where d is some delay. (For the remainder of this disclosure, the understood time dependence will be suppressed.)

Viewing a as a vector indexed x, the result $I_1$ may be regarded as (the real part of) the outer product of a with itself, that is, $I_1$ is a matrix whose entries are all the possible products of one element of a with another element of a. The result $I_2$ contains the same information in a different format. The format description provides coordinates which explicitly index the two factors, while the latter format gives one coordinate which is the difference between the indices of a.

BRIEF DESCRIPTION OF THE PRIOR ART.

To effect the outer product described hereinabove using a lateral shearing interferometer requires that many lateral shears be applied simultaneously; however, lateral shearing interferometers found in the prior art apply only one shear at a time. Such interferometers are typified by U.S. Pat. No. 4,711,576 to Ban and U.S. Pat. No. 4,707,137 to Lee.

Conceptually, the first step in achieving the desired outer product might be a system which makes the input uniform in one direction while retaining the variation in x. This is effected by the Fourier transform with respect to y, producing $$\widetilde{a_y}(x,\zeta) = \int_{-\infty}^{\infty} a(x,y)e^{-j2\pi y\zeta}dy$$
$$\equiv a(x).$$

By applying a rotational or reversing interferometer to this one-dimensional transform, an interference term bearing the desired outer product may be obtained. For example, a rotational shearing interferometer which shears 90° could produce an intensity $$|\widetilde{a_y}(x,\zeta) + \widetilde{a_y}(\zeta,-x)|^2 = |a(x) + a(\zeta)|^2$$
$$= |a(x)|^2 + |a(\zeta)|^2 + 2Re\{a(x)a^*(\zeta)\}.$$

The latter (interference) term bears the required product. Similarly, a reversing shearing interferometer which reflects about the diagonal can produce $$|\widetilde{a_y}(x,\zeta)+\widetilde{a_y}(\zeta,x)|^2 = |a(x)|^2 + |a(\zeta)|^2 + 2Re\{a(x)a^*(\zeta)\}.$$

Rotational interferometers in the prior art employ a pair of Dove prisms—an arrangement which is not common path, is expensive, and is difficult to stabilize. Such apparatus is described by Matveev et al., Soviet Journal of Optical Technology, Vol. 48, August 1981, pp. 449–451. A reversing interferometer proposed by Mertz and described in U.S. Pat. No. 4,758,976 to Cohen, consisting of a Michelson interferometer having a roof prism in one leg and an ordinary mirror in the other, can be fashioned as a block, but with extreme difficulty of fabrication and expense. An alternative reversing interferometer described by U.S. Pat. No. 4,556,950 to Tai et al. consist of multiple gratings and is a separate-path arrangement which is not mechanically stable. Tai et al. also produces its output on a grazing-incidence beam combiner, requiring difficult optics to recover the interference results.

SUMMARY OF THE INVENTION

Accordingly, it is an object of this invention to provide an optical interferometer which overcomes the limitations of the prior art.

It is a further of this invention to provide an outer product interference between all points on an optical source of one-dimensional extent.

It is a still further of this invention to provide an interferometer which is highly stable mechanically and thermally.

It is yet another object of this invention to provide an interferometer which is easily and inexpensively constructed.

An apparatus having these and other desirable features would include a light source located in an input plane having one-dimensional extent along an axis, means for detection located in an output plane, means for imaging light from said input plane to said output plane, and a mask located in the Fourier transform plane of said imaging means, said mask being opaque except for segments of two nonparallel lines, with neither of said lines being perpendicular to said axis of said light source.

BRIEF DESCRIPTION OF THE FIGURES

Other objects and advantages of may invention will become apparent from a study of the following specification when viewed in the light of the accompanying drawings, in which.

DETAILED DESCRIPTION OF THE PREFERRED EMBODIMENT

Figure 1:
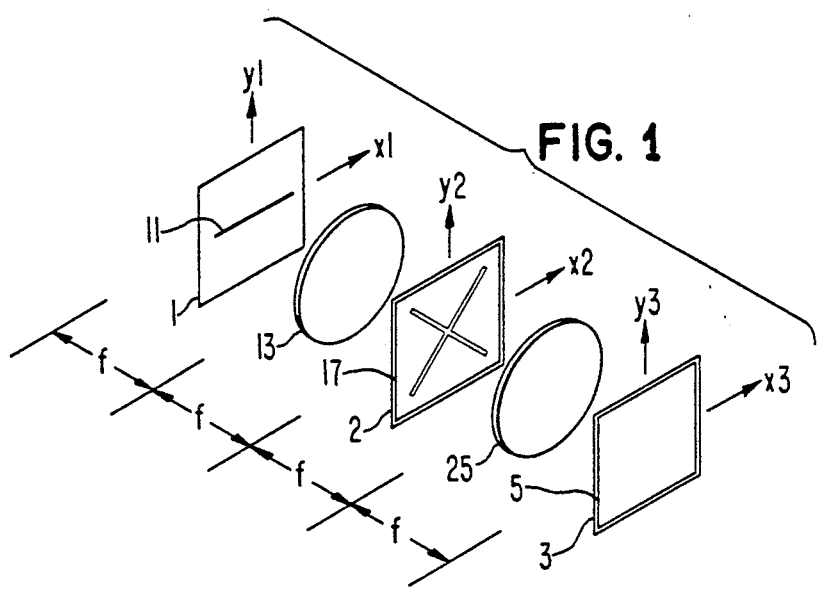
FIG. 1 is an optical schematic diagram of a preferred embodiment.

As depicted in FIG. 1, lenses 13 and 25 form an imaging system between input plane 1 and output plane 3. An intermediate Fourier transform plane 2 is located in the back focal plane of lens 13 and the front focal plane of lens 25. Here, a mask 17 of amplitude transmittance $m(x_2, y_2)$ is located. (This mask is further described below.)

Let $\alpha_i(x_i, y_i)$ denote the scalar field amplitude arriving at plane i and let $\alpha_i'(x_i, y_i)$ denote the scalar field amplitude leaving plane i. The one-dimensional source 11, located in input plane 1, and having wavelength $\lambda$, has its axis in the x direction and produces light of amplitude $$\alpha'_1(x_1, y_1) = a(x_1)\delta(y_1).$$

Lenses 13 and 25 have a focal length of f. Because of the well-known Fourier transform property of lenses, the light's amplitude at plane 2 is the two-dimensional Fourier transform of the amplitude leaving plane 1. Thus, $$\alpha_2(x_2,y_2) = \int\int \alpha_1'(x_1,y_1)e^{-j2\pi(x_1x_2+y_1y_2)/\lambda f}dx_1 dy_1$$
$$= \int a(x_1)e^{-j2\pi x_1 x_2/\lambda f}dx_1.$$

The mask 17 in plane 2 merely multiplies the passing light amplitude, so that $$\alpha'_2(x_2,y_2) = \alpha(x_2, y_2)m(x_2,y_2).$$

Passing from plane 2 to plane 3 results in another two-dimensional transform, producing $$\alpha_3(x_3,y_3) = \int\int \alpha_2'(x_2,y_2)e^{-j2\pi(x_2x_3+y_2y_3)/\lambda f}dx_2 dy_2$$
$$= \int a(x_1)\tilde{m}\left(\frac{x_1 + x_3}{\lambda f}, \frac{y_3}{\lambda f}\right)dx_1,$$

where $$\tilde{m}(\eta,\zeta) = \int,\int m(x,y)e^{-j2\pi(x\eta + y\zeta)}dx\,dy.$$

Figure 2A:
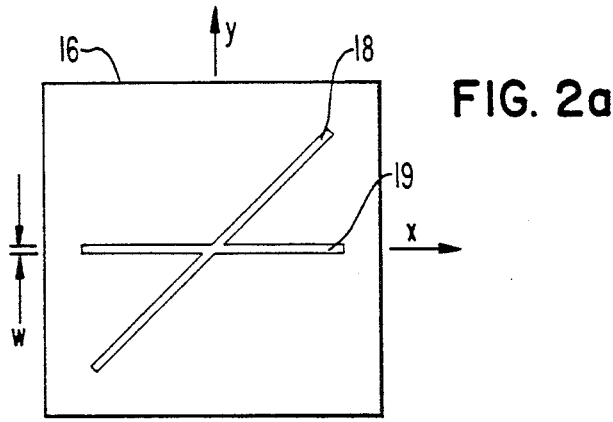
FIGS. 2a and 2b are diagrams of alternative masks employed in the embodiment.
Figure 2B:
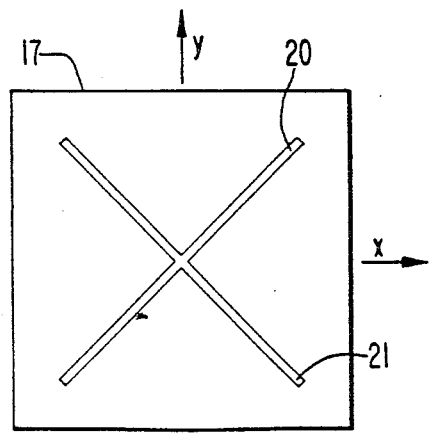

The mask in plane 2 is opaque except for two lines which intersect at the center. Two cases will be considered here, with superscripts identifying the respective functions. The first case uses mask 17 (FIG. 2b), which is opaque except for two clear lines 20 and 21 that meet at right angles. Mask 17 multiplies the amplitude by $$m^1(x,y) = p(y+x) + p(y-x),$$

where p(x), to be specified later, describes the line profile. The second case uses mask 16 (FIG. 2a), which has slits 18 and 19 meeting at a 45 degree angle and which multiples the passing light amplitude by $$m^2(x,y) = p(y) + p(y-x).$$

Let p denote the Fourier transform of p. Then substitution of the mask functions results in $$\alpha_3^1(x_3,y_3) = \lambda f \tilde{p}\left(\frac{y_3}{\lambda f}\right)[a(-x_3 - y_3) + a(-x_3 + y_3)]$$

and $$\alpha_3^2(x_3,y_3) = \lambda f \tilde{p}\left(\frac{y_3}{\lambda f}\right)[a(-x_3 - y_3) + a(-x_3)],$$

respectively.

Output plane 3 may contain any contain detection means 5 suitable for studying the outer product including, though not limited to, photographic film, an array of photodetectors, a vidicon, or the write face of a light-to-light modulator. In particular, this outer product interferometer is an appropriate shearing interferometer for the triple product processor disclosed by Cohen (U.S. Pat. No. 4,758,976) in which the preferred detector is an array of semiconductor photodetectors. The detection means 5 will see an intensity which is either $$\left|\alpha_3^1(x_3,y_3)\right|^2 = \left|\lambda f \tilde{p}\left(\frac{y_3}{\lambda f}\right)\right|^2 [|a(-x_3 - y_3)|^2 +$$
$$|a(-x_3 + y_3)|^2 + 2Re\{a(-x_3 - y_3)a^*(-x_3 + y_3)\}]$$

$$\left|\alpha_3^2(x_3,y_3)\right|^2 = \left|\lambda f \tilde{p}\left(\frac{y_3}{\lambda f}\right)\right|^2 [|a(-x_3 - y_3)|^2 +$$
$$|a(-x_3)|^2 + 2Re\{a(-x_3)a^*(-x_3 - y_3)\}],$$

respectively. Except for the multiplicative factor in front, for the mask 17, one may define the orthogonal axes $x = -x_3 - y_3$, $y = -x_3 + y_3$ and find that the interference term for the first case bears the desired product $I_1$. Similarly, for mask 16, one may define the orthogonal axes $x = -x_3$ and $y = -y_3$, and find that the interference term carries the product $I_2$.

To avoid weighting of the output, p must be uniform enough over the desired range of $y_3$. If the mask lines are slots of width w, so that $$p(y) = \begin{cases} 1, |y| \leq w/2 \\ 0 \text{ otherwise,} \end{cases}$$

then $$\left|\lambda f \tilde{p}\left(\frac{y_3}{\lambda f}\right)\right|^2 = (\lambda f w)^2 \text{sinc}^2\left(\frac{wy_3}{\lambda f}\right),$$

where $$\text{sinc}(y) = \frac{\sin(\pi y)}{\pi y}.$$

Now suppose that the length of the source 11 is l. Then as long as $$w < \frac{\lambda f}{l},$$

the weighting function in front will be nearly constant for all values of $y_3$ of interest.

Since both "paths" of the interferometer are essentially coincident, the interferometer is extremely stable. Moreover, the fringes are not very sensitive to mask alignment. Small vertical (y) movements of the mask will have no effect on the result. Positioning errors of the mask along the optic axis have the effect of broadening p and decreasing the effective input aperture. Horizontal (x) translation is the only critical adjustment and, if in error, will result in horizontal fringes in the output.

The source 11 in the embodiment need not be a primary source of light. Light in the input plane 1 may result from any process or apparatus suitable for the application. In particular, this outer product interferometer is an appropriate shearing interferometer for the triple product processor disclosed by Cohen (U.S. Pat. No. 4,758,976) in which the input plane exists in an acoustooptic device, and the light source is light leaving said acoustooptic device.

Other lens systems for imaging and transforming may be used to achieve embodiments with different scales, aberations, and the characteristics suitable for the intended application.

The arrangement and shape of slits in the masks may be modified to achieve different output scaling, output weighting, image point spread function, and other characteristics suitable for the intended application. In particular, the slits may meet an angles other than 90 or 45 degrees, resulting in anamorphic scale changes in the output plane. Phase-shifting modifications may be made to the slits to produce real and imaginary components of the outer product of a complex source.

Those skilled in the art will recognize that my invention may take many forms other than the embodiments described herein, and that I intend that my invention be limited only as set forth in the appended claims.

I claim:

1. An outer product interferometer, comprising:
   a light source located in an input plane having one-dimensional extent along an axis;
   means for detection located in an output plane;
   means for imaging light from said input plane to said plane; and
   a mask located in the Fourier transform plane of said imaging means, said mask being opaque except for segments of two nonparallel lines, with neither of said lines being perpendicular to said axis of said light source.

2. An outer product interferometer, comprising:
   a light source located in an input plane having one-dimensional extent along an axis;
   means for detection located in an output plane;
   means for imaging light from said input plane to said output plane; and
   a mask located in the Fourier transform plane of said imaging means, said mask being opaque except for segments of two nonparallel lines, with neither of said lines being perpendicular to said axis of said light source, said lines intersecting at the center of said mask, both of said lines making the same angle with said axis of said light source.

3. An outer product interferometer, comprising:
   a light source located in an input plane having one-dimensional extent along an axis;
   means for detection located in an output plane;
   means for imaging light from said input plane to said output plane; and
   a mask located in the Fourier transform plane of said imaging means, said mask being opaque except for segments of two nonparallel lines, with neither of said lines being perpendicular to said axis of said light source, said lines intersecting at the center of said mask, the first of said lines being parallel to the axis of said light source.

* * * * *